B. H. CALKIN & E. W. MAYFIELD.
PROCESS OF PREPARING AND DISPENSING BEVERAGES.
APPLICATION FILED MAR. 31, 1905.
994,975.
Patented June 13, 1911.
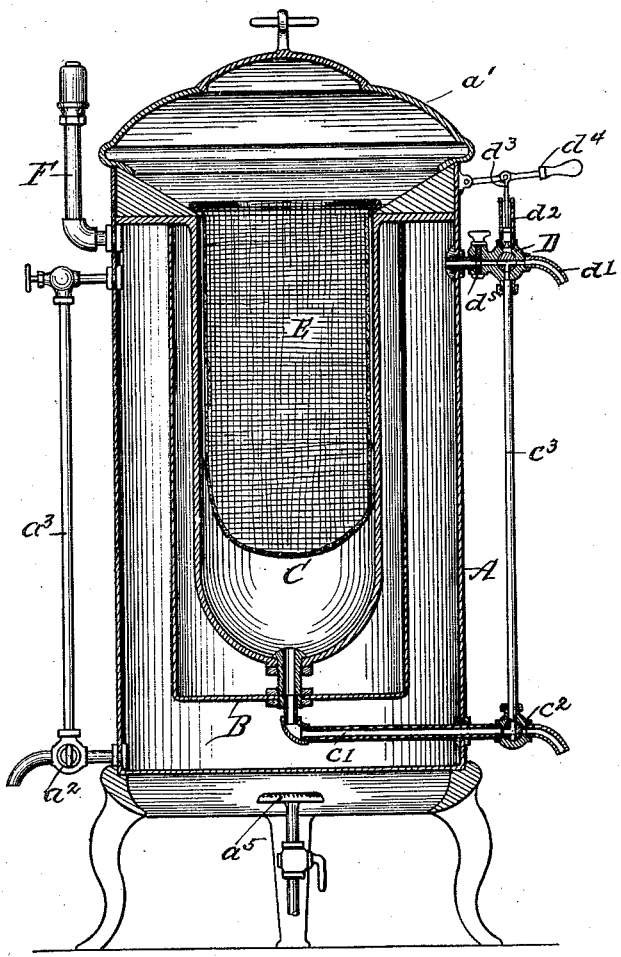
Witnesses:
John Braunwalder
R. B. MacIntosh
Inventors:
Benjamin H. Calkin
E. Wellington Mayfield,
By Frederick Benjamin Att'y.

UNITED STATES PATENT OFFICE.

BENJAMIN H. CALKIN AND EDWIN WELLINGTON MAYFIELD, OF CHICAGO, ILLINOIS.

PROCESS OF PREPARING AND DISPENSING BEVERAGES.

994,975.  Specification of Letters Patent.  Patented June 13, 1911.

Application filed March 31, 1905. Serial No. 253,052.

*To all whom it may concern:*

Be it known that we, BENJAMIN HOVEY CALKIN and EDWIN WELLINGTON MAYFIELD, citizens of the United States, residing at Chicago, in the county of Cook and State of Illinois, have invented certain new and useful Improvements in Processes of Preparing and Dispensing Beverages, of which the following is a specification.

Our invention is a method of preparing and dispensing beverages, and is particularly intended for the production and keeping of liquid coffee in a good palatable condition for an indefinite time.

In restaurants, cafes and other public eating places, it is customary to prepare liquid coffee in large quantities, with a view to meeting the demands of the patrons and to the economical production of the beverage. Great difficulty has been experienced, however, in keeping the coffee in a palatable condition, owing to two causes, mainly; first, the extract if allowed to remain undisturbed for any length of time has a tendency to stratify, owing to the specific gravity of the different portions, so that the heavier liquid, which is first drawn off, is practically unfit for consumption, and, secondly, the operation of mechanically repouring the liquid through the coffee container, exposes such liquid to the oxidizing influence of the external atmosphere.

Our invention overcomes these two most serious defects in the commercial production and storage of liquid coffee. We prepare the extract in a chamber closed against the admission of atmospheric air, and it is stored in such chamber below, and free from contact with, the woody fiber or pulpy residue of the coffee berry. For the purpose of overcoming stratification of the liquid coffee, without exposing the same to the oxidizing effect of the air, and without changing the temperature of the stored extract, we mechanically agitate the liquid by injecting therein a current of hot aeriform fluid, preferably steam. Said agitating fluid is injected at a temperature equal to, or above the temperature of the stored liquid, and it is supplied directly into the body or mass of said stored extract, below the level thereof.

In the making of coffee beverages from the ground berry as at present carried on, where an urn is used, it is necessary, in order to get the best results and the proper strength, to draw off the first decoction or liquor which results from pouring boiling water on the coffee, and then repour said decoction or liquor back through the ground coffee into the urn. One reason for this operation is that the ground coffee contained with the receptacle inside the urn, packs tightly in said receptacle as soon is it becomes moist, so that the grounds are not thoroughly exposed to the action of the hot water; and a further reason is that the first extraction from the ground coffee is stronger and of greater specific gravity than that subsequently made, so that the first decoction or liquor will remain at the bottom of the coffee urn unless the portions of different specific gravities are properly mixed. The liquid coffee in the lower portion of the jar is usually drawn off through a cock or faucet into a vessel and poured back into the coffee receptacle within the urn, thereby subjecting the ground coffee repeatedly to the action of the liquor, and at the same time mixing the heavier or stronger beverage with the lighter or weaker beverage, resulting in a production which is uniform in strength and specific gravity. While these operations are being performed the urn is out of service, and for obvious reasons, this is objectionable. Another objection to the repouring process is that the coffee extract is subjected to the oxidizing influence of the external atmosphere, and the coffee becomes tasteless and unpalatable.

Our new method avoids the necessity for withdrawing and repouring the beverage, but we obtain satisfactory results in the extraction and mixing of the beverage, besides securing other advantages which will be apparent to those skilled in the art.

Our invention may be practiced by any suitable form of apparatus, but in the drawing we have illustrated a vertical section of a coffee urn which is equipped with one embodiment of means for carrying out our method.

Referring to said drawing, A designates an outer casing of a coffee urn, the upper part of which is closed by a suitable cover, $a'$. Said urn is equipped with an ordinary hot water faucet, $a^2$, a water gage, $a^3$, a safety pipe F, a coffee faucet, $c^2$, a coffee gage, $c^3$, and a suitable form of heater, $a^5$. Within the casing, A, is a cylindrical jacket, B, the space between the bottom and sides of said jacket and the bottom and sides of the casing forming a hot water chamber.

Within the jacket, B, is a coffee jar, C, said jar being supported within the jacket in a suitable way, and is preferably spaced therefrom to leave an intermediate chamber. The jar, C, is adapted to contain a suitable receptacle for the ground coffee berry, and as usual in the art, this receptacle is a coffee bag E supported removably within the upper part of the jar.

A draw off pipe, $c'$, is attached to the bottom of the jacket, B, said pipe extending through the jacket and being coupled to the bottom of the coffee jar. This pipe passes between the casing, A, and the jacket, B, and its outer end is attached to the coffee drawing faucet, $c^2$, the latter being equipped with a two-way valve. Said valve is adjustable to establish communication between the pipe, $c'$, and the coffee gage, $c^3$, but the valve may be turned so as to establish communication between the pipe, $c'$, and the faucet, $c^2$.

The gage tube, $c^3$, extends upwardly from the faucet, $c^2$, the upper end of said gage tube being secured to and communicating with a valve casing, D. This valve casing is provided with a nozzle, $d'$, and a tubular extension, $d^2$, and within the valve casing there is provided a two-way valve of any desired pattern. In the tubular extension, $d^2$, is slidably mounted a pump valve, $d^3$, adapted to be operated by a hand lever, $d^4$. The valve casing, D, is coupled to the casing A, so as to have communication with the water and steam chamber of the urn, and in the passage between the valve casing, D, and the casing, A, operates a stop cock, $d^5$, by which communication is controlled between said valve casing and the aforesaid water or steam chamber of the urn.

With the exception of the casing, D, and the attachments described, the urn is quite similar to those in common use in restaurants, hotels and the like. Where such an urn is one of a battery of urns, or where the urn has exterior steam connections for heating water in the chamber surrounding the jacket, B, we may attach a pipe to the nozzle, $d'$, when carrying out our method of preparing and dispensing coffee. By opening the valve in the casing, D, so that communication is established between the nozzle, $d'$, and the gage tube, $c^3$, and at the same time closing the stop cock, $d^5$, we are able to supply steam from an external boiler, whereby steam may pass through the gage tube, $c^3$, through the valve in the faucet, $c^2$, and thence through the pipe, $c'$, upwardly into the jar, C, through the bottom of the latter.

The steam injected directly into the liquid extract or decoction contained in the lower part of the jar, C, will agitate said extract or decoction, thereby mixing the heavier decoction or liquor in the lower part of the jar with the lighter portion of the liquid in the intermediate or upper part of the jar, whereby stratification of the liquid extract is obviated. Should the ground berry or coffee be immersed in the liquid extract or decoction, agitation of the liquid by the injection of the current of steam therein will agitate the mass of ground coffee contained in the bag or receptacle, E, thereby exposing the particles of the ground coffee to the action of the liquor or decoction, whereby the coffee essence is extracted more thoroughly and effectively than would be possible with the grounds remaining in a compact mass. Incidently, the passage of the steam through the pipe, $c^3$, the faucet, $c^2$, and the pipe, $c'$, will serve to clean or flush out the latter.

Instead of utilizing steam under pressure and injected into the liquid extract or decoction, for the purpose of agitating said decoction without exposing it to air and without change in temperature, as heretofore described, we may open the valve in the casing, D, so that its ports will communicate, respectively, with the extension, $d^2$, and the gage tube, $c^3$, after which the lever, $d^4$, may be manipulated so as to draw air in through the tube of the extension, $d^2$, and around the pump valve, whereby air may be forced down through the casing, D, the gage, $c^3$, the faucet, $c^2$, and the pipe, $c'$, upwardly into the jar, C, for the purpose of agitating the beverage or decoction. It is preferred, however, to employ steam for agitating the liquid extract, because the steam when injected under the required pressure is at a temperature which will not lower the temperature of the beverage or decoction, and which will agitate the decoction without exposing it to the oxidizing influence of the air. As previously described, the steam may be supplied from an external source through a nozzle, $d'$, but if steam is generated within the chamber surrounding the jacket, B, the stop cock, $d^5$, may be opened and the valve in the casing, D, may be adjusted so that its ports may register with the stop cock opening and the gage, $c^3$, whereby steam will pass from the chamber of the casing, A, through the valve casing, D, the gage, $c^3$, and the pipe, $c'$, into the jar, C.

The method of preparing and dispensing beverage herein described should not be confused with prior methods or appliances wherein steam is utilized for cooking the substances operated upon. While we may employ steam in carrying out our method, it is preferred to employ some medium which will have no chemical or cooking effect on the coffee, and, accordingly, we may, in some instances, employ either hot or cold water under pressure. It is to be understood that we subject the liquid extract or decoction to the action of a current composed of a suitable medium for the purpose of stirring up the liquid extract and of agitating the ground coffee so that the hot water in the urn may become intimately associated with the ground coffee and with the heavier extract, whereby stratification of the extract is obviated and the decoction is thoroughly mixed.

In the process of preparing the beverage, the urn is partly filled with hot water and the ground coffee is immersed in the water, the steam or other medium being admitted for the purpose of agitating the liquid so as to extract the essence from the coffee. In the service of the urn, the liquid extract is drawn through the faucet, $c^2$, and, practically speaking, the decoction or extract is contained in the lower part of the jar, C, free from contact with the bag, E, and the coffee grounds therein, whereby the extract or beverage is stored within a heated chamber so that it will not absorb or become flavored with the woody fiber or pulpy residue of coffee grounds. The extract may, from time to time, be agitated by admitting steam thereto for the purpose of thoroughly mixing the lighter and heavier particles of the beverage, and, on the whole, the beverage is stored and kept in a hot, palatable condition for several hours.

Having thus fully described the invention, what we claim as new, and desire to secure by Letters Patent is:

1. The method of preparing and dispensing beverages which consists in first preparing a liquid extract from a vegetable mass within a vessel closed from communication with atmospheric air, heating the prepared extract, and subsequent to the preparation of the extract, agitating said extract, without exposure to air and without change in temperature, by injecting a current of steam under pressure directly into the liquid extract, whereby stratification of the liquid is overcome and all portions thereof are thoroughly mixed.

2. The method of preparing and dispensing beverages which consists in making an extract by admitting water to a vegetable mass; storing such extract in a chamber closed against the admission of atmospheric air, agitating the liquid extract subsequent to its preparation by injecting directly into the mass thereof a current of heated fluid, whereby stratification of the extract is obviated and the light and heavy particles thereof are commingled, and drawing the extract direct from the aforesaid storage chamber.

3. The method of preparing and dispensing beverages which consists in making an extract by admitting hot liquid to a vegetable mass; storing such extract in an air tight chamber; agitating the liquid extract subsequent to its preparation and while stored within said chamber by injecting steam directly into the body of such extract, whereby stratification of the extract is obviated and the light and heavy liquids are mixed, without exposure to the oxidizing influence of air and change of temperature of the extract, and dispensing the extract from said chamber.

4. That improvement in the art of dispensing beverages, which consists in storing a prepared extract within a closed chamber, and agitating said extract subsequent to its preparation by injecting a current of steam directly into the mass or body of such extract, whereby stratification is obviated, and the constituents of the liquid are mixed without exposure to the oxidizing influence of the air or involving a change in the temperature of the beverage.

5. The improvement in the art of dispensing beverages, such as tea or coffee, which consists in storing the beverage within a substantially air tight chamber; injecting a current of steam directly into said beverage subsequent to its preparation and while stored within the chamber, whereby the beverage is agitated for the purpose of mixing its light and heavy elements, thus precluding stratification of the beverage without changing its temperature, and dispensing the beverage from said chamber.

6. The improvement in the art of preparing and dispensing beverages which consists in supporting a solid essence bearing material within a closed chamber, supplying liquid to said material and preparing a liquid extract therefrom, storing the prepared extract in said chamber, agitating the extract subsequent to its preparation, and bringing the agitated extract in contact with the essence-bearing material, by injecting a current upwardly into the liquid extract, and dispensing the liquid extract from the closed chamber.

In testimony whereof we affix our signatures in presence of two witnesses.

BENJAMIN H. CALKIN.
E. WELLINGTON MAYFIELD.

Witnesses:
M. SIMONS,
ELMER C. KIMBALL.